A. H. ROGERS.
Elastic-Faced Printing Type.
No. 8,401. Reissued Sept. 3, 1878.
Elastic Faced Printing Types.
Fig. II
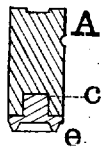
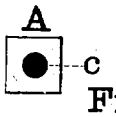
Fig. I
R. Hale Smith
WITNESSES
Geo. H. Andrews
INVENTOR
Arthur H. Rogers.
N. PETERS, PHOTO-LITHOGRAPHER, WASHINGTON, D. C.

UNITED STATES PATENT OFFICE.

ARTHUR H. ROGERS, OF SPRINGFIELD, MASSACHUSETTS, ASSIGNOR TO R. H. SMITH & CO., OF SAME PLACE.

IMPROVEMENT IN ELASTIC-FACED PRINTING-TYPES.

Specification forming part of Letters Patent No. 201,632, dated March 26, 1878; Reissue No. 8,401, dated September 3, 1878; application filed June 29, 1878.

*To all whom it may concern:*

Be it known that I, ARTHUR H. ROGERS, of Springfield, in the State of Massachusetts, have invented a new and useful Improvement in Elastic-Faced Printing-Type; and that the following is a full, clear, and exact description thereof, reference being had to the accompanying drawing, make a part of this specification, and to the letters of reference marked thereon.

My invention relates to a printing-type having an elastic printing-face, and adapted to be set up singly in any ordinary stamp or form, to make up and print any desired matter; and it consists of a metal body or base of the usual form ordinarily used by printers and a printing-face composed of a compound of rubber, which is molded and vulcanized onto it, in a manner hereinafter described.

Figure I is a plan view of the end of the metal body onto which the rubber printing-face is to be formed, and Fig. II is a longitudinal central section through the metal body and the rubber face after the type is completed.

In the drawing, A represents the metal body of an ordinary type; but instead of a printing metal face being made on the lower end, in the usual manner, the end is made plain or flat, and a hole, *c*, made therein to any desired depth. (Shown also in Fig. II.) Onto this end of the metal body, having the hole *c* therein, is molded the rubber printing-face, which, after vulcanizing, adheres firmly to the metal body A.

The following is the process I use for molding and vulcanizing the elastic printing-faces onto the metal bodies: I take any number of alphabets of ordinary printing-type, of any desired styles of letters, and arrange them in an ordinary printer's form or chase, except that it is sufficiently deep to take in the whole length of the body to which the rubber face is to be attached. When they are thus secured I place upon the printing-faces of these type a layer of some plastic material which will set or afterward become hard, to form a mold, such as plaster-of-paris or some similar substance. When this has set I carefully remove it, and remove also the type from the form, and place in their stead, in exactly the same places, the metal bodies of the same size, with both ends squared off, and with the hole *c* in one end, the latter occupying the same position in the form as did the metal printing-faces of the type which were removed. I then place a sheet of rubber in the same position upon the metal bodies as the plastic material occupied upon the metal-faced type, place the mold formed upon this sheet, and then place the whole between iron plates and bolt them strongly together, which drives the rubber into the letters of the mold and also into the cavities in the ends of the metal bodies, and the whole is then inclosed in a vulcanizing pan or vessel and heated, as in the ordinary process of vulcanizing rubber. When this is completed I remove the whole from the pan or vessel, remove the mold, and all the metal bodies are held to the rubber sheet, the latter having, by the vulcanizing process and the pressure applied, entered and filled the hole *c* in each body, and a letter of rubber is formed on each body corresponding to the letter of each metal type which occupied the position of the respective bodies. I then pass a sharp knife between the metal bodies and cut the rubber sheet between the letters, so that each is entirely separate from the others; and the type are now ready for use.

The type thus made have an elastic printing-face, and possess all the advantages of ordinary rubber stereotypes, while all the disadvantages of such plates are obviated. For example, if a person desires to print with rubber his name, together with any special business or other matter connected therewith, the whole ordinarily has to be made in one plate, and such plate cannot be changed to print any other matter. By the use of my invention, however, such person can himself set up these metal-bodied rubber type in any common stamp or form constructed for holding ordinary metal type, clamp them firmly together, and print the desired matter, and then change the stamp or any part of it by removing any number of the type and inserting and securing others. This cannot be successfully done with any solid rubber type, as the rubber, being elastic, is pressed out of shape and place by the operation of clamping or locking up for the purpose of holding them while printing.

Having thus described my invention, what I claim as new, and desire to secure by these Letters Patent, is—

1. The process of making interchangeable elastic-faced printing-types, consisting of molding, substantially as described, a sheet of rubber type-faces onto a series of metal bodies locked together and secured to the mold, vulcanizing the sheet while in the mold, and then, by cutting the faces apart, separating the types, as set forth.

2. An improved printing-type consisting of the metal body A, having a recess, *c*, made in one end, and the elastic or rubber face *e* pressed into said recess and secured, substantially as herein described.

ARTHUR H. ROGERS.

Witnesses:

R. HALE SMITH,

GEORGE W. ANDREWS.